R. B. LARRABEE.
COMPUTING SCALE.
APPLICATION FILED APR. 4, 1911.

1,022,030.

Patented Apr. 2, 1912.

3 SHEETS—SHEET 1.

Witnesses

Inventor
R. B. Larrabee

By
Attorneys.

COLUMBIA PLANOGRAPH CO., WASHINGTON, D. C.

R. B. LARRABEE.
COMPUTING SCALE.
APPLICATION FILED APR. 4, 1911.

1,022,030.

Patented Apr. 2, 1912.

3 SHEETS—SHEET 2.

Witnesses

Inventor
R. B. Larrabee

By
Attorneys.

R. B. LARRABEE.
COMPUTING SCALE.
APPLICATION FILED APR. 4, 1911.

1,022,030.

Patented Apr. 2, 1912.
3 SHEETS—SHEET 3.

Inventor
R. B. Larrabee

Witnesses
W. N. Woodson
Juana M. Fallin

By
Attorneys.

COLUMBIA PLANOGRAPH CO., WASHINGTON, D. C.

UNITED STATES PATENT OFFICE.

RALPH B. LARRABEE, OF ANSON, MAINE.

COMPUTING-SCALE.

1,022,030. Specification of Letters Patent. Patented Apr. 2, 1912.

Application filed April 4, 1911. Serial No. 618,963.

*To all whom it may concern:*

Be it known that I, RALPH B. LARRABEE, citizen of the United States, residing at Anson, in the county of Somerset and State of Maine, have invented certain new and useful Improvements in Computing-Scales, of which the following is a specification.

My invention relates to scales and particularly to computing scales wherein the weight of the object being weighed is displayed in conjunction with certain indicia.

The primary object of my invention is the provision of a very effective form of weighing scale, particularly adapted for weighing commodities, and which is also capable of being used for weighing freight or express matter, the scale being so arranged as to display characters indicating not only the weight of the article, but also the total charge for the article.

Another object of the invention is to provide means for cushioning the scale beam, both upon its upward movement and upon its downward movement, thus eliminating the shock and jar incident to the beam or the scale platform reaching the end of its travel and thus preventing the delicate mechanism of the scale from being damaged.

Figure 1:
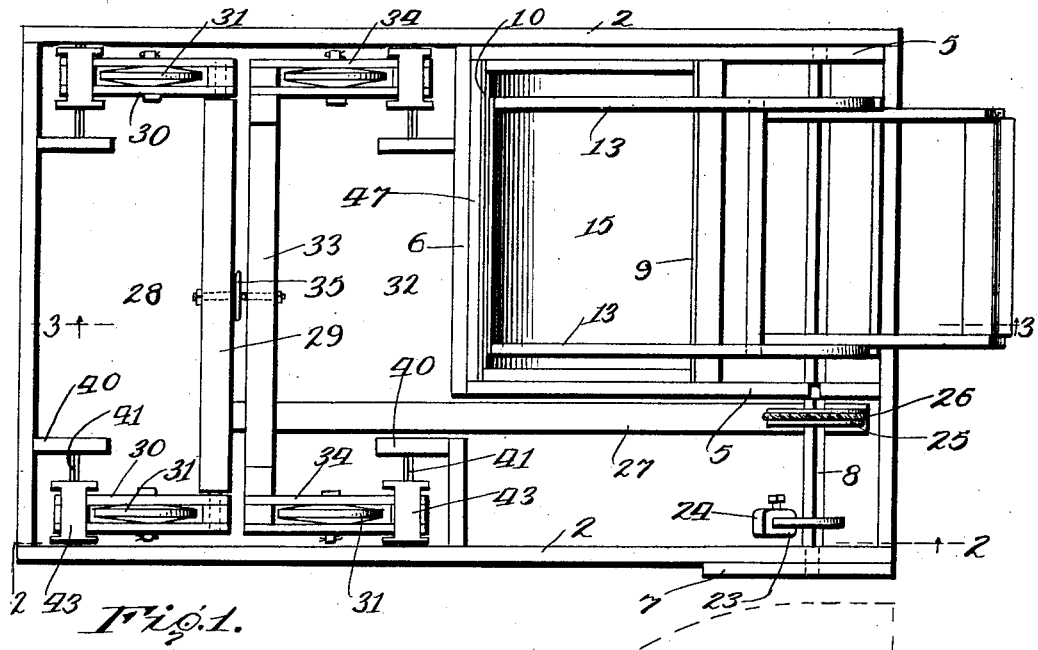
Figure 2:
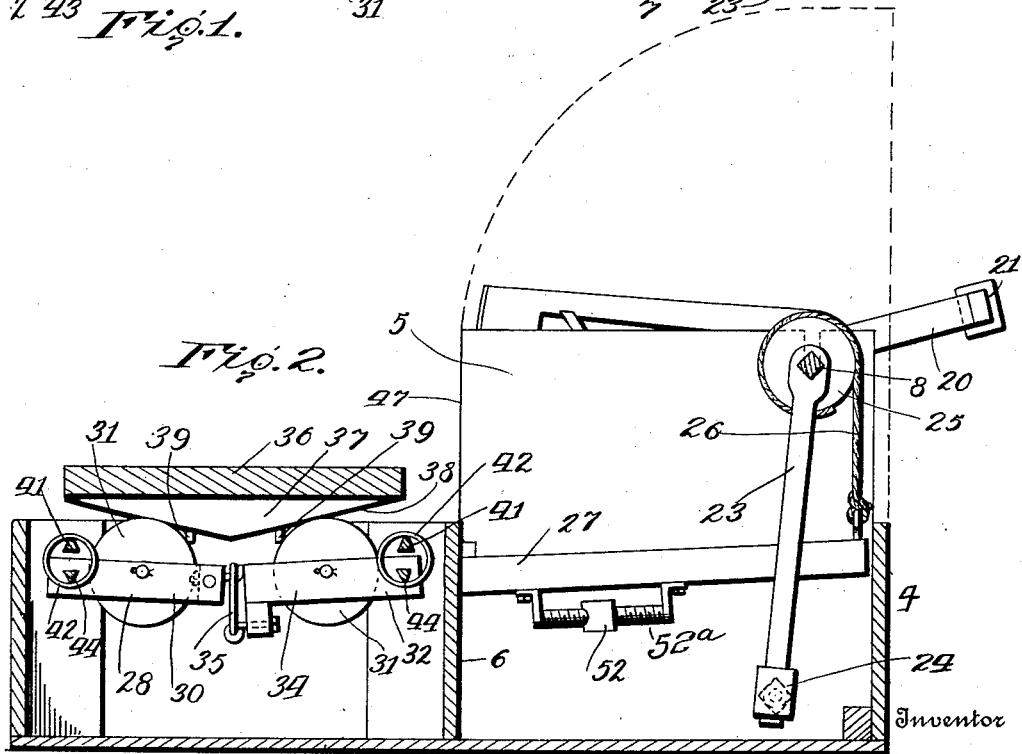
Figure 3:
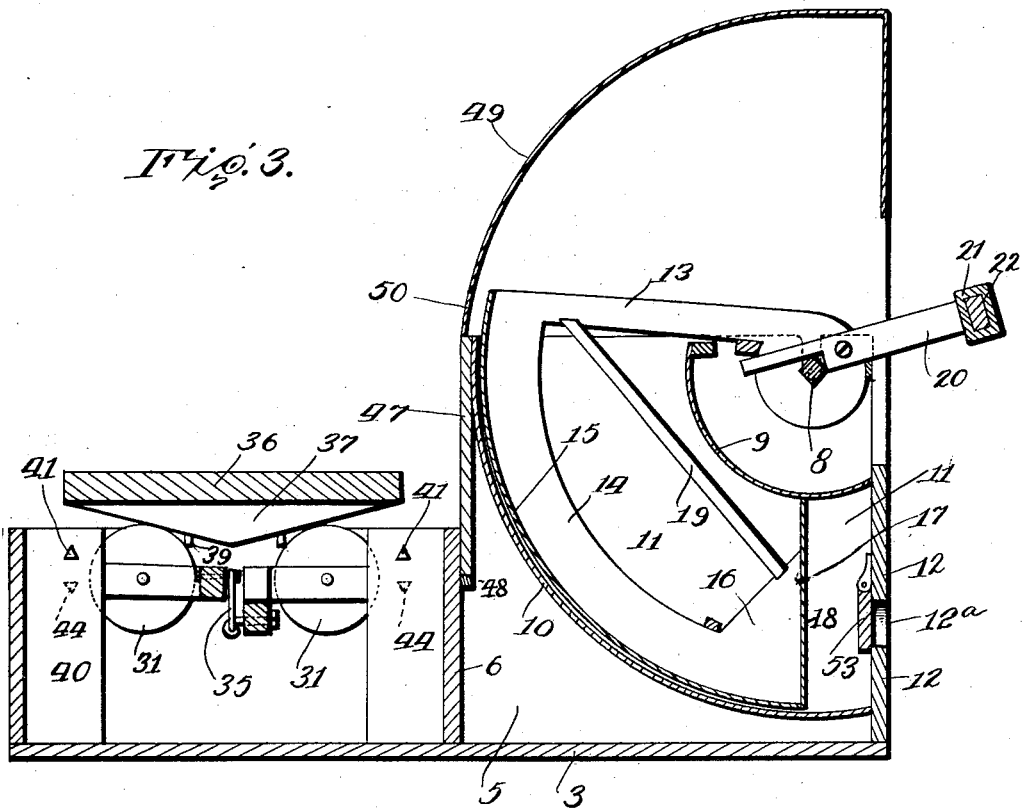
Figure 4:
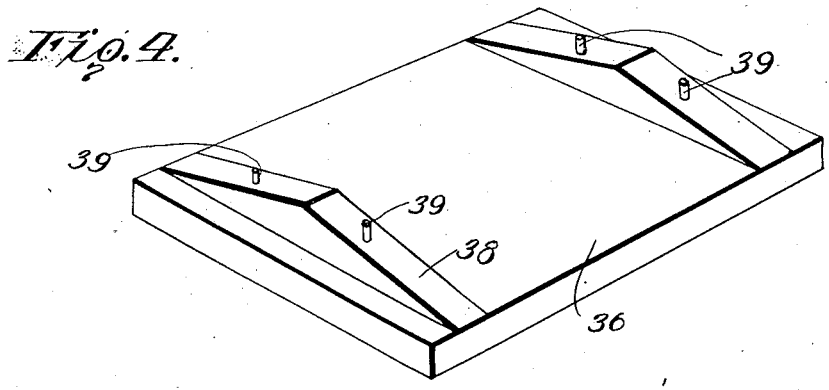
Figure 5:
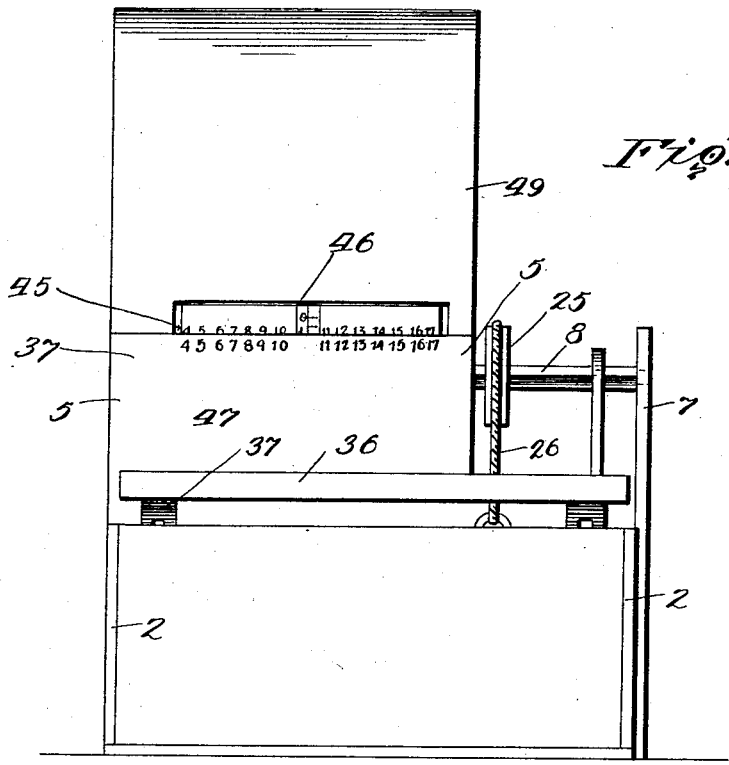
Figure 7:
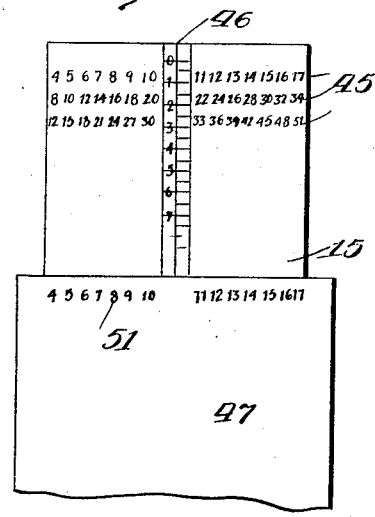
Figure 6:
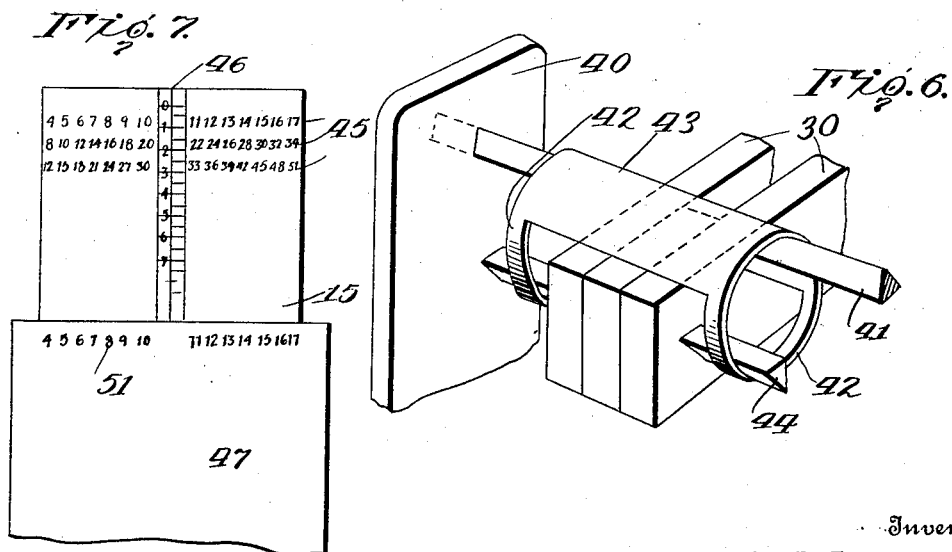

An embodiment of my invention is shown in the accompanying drawings wherein:

Figure 1 is a plan view of my invention. Fig. 2 is a section on the line 2—2 of Fig. 1. Fig. 3 is a section on the line 3—3 of Fig. 1. Fig. 4 is a perspective view of the weighing platform inverted. Fig. 5 is a front elevation of the machine. Fig. 6 is a perspective detail view enlarged of one of the bearings for the platform. Fig. 7 is a diagrammatic elevation of the co-acting scale plates.

Corresponding and like parts are referred to in the following description and indicated in all the views of the accompanying drawings by the same reference characters.

The frame upon which my scale is supported is shown as comprising the side pieces 2, the bottom 3 and end piece 4. Located at one end of the frame are the upwardly extending standards 5 which are relatively wide to form side pieces for the side walls of an air chamber as will be later described. These side pieces are connected by a cross piece 6. Extending upwardly from one of the side pieces 2 of the frame, is a standard 7 for supporting a transverse rock shaft 8 which passes through the standards 5 and into the standard 7, and upon which the scale beam is carried. The space between the relatively wide standards or walls 5 is traversed by a downwardly and rearwardly curved wall 9 and by a downwardly and rearwardly curved wall 10, the wall 10 being concentric to the wall 9 but spaced therefrom. It will be seen that the space inclosed between the walls 9 and 10 and the side walls 5 forms an air chamber designated 11, this air chamber being closed at its lower end by a wall 12, the upper end of the air chamber being open.

Mounted upon the shaft 8 are the arms 13 which carry the downwardly extending curved bars 14, the faces of these bars being curved in the same arc as the curvature of the wall 10. Attached to the faces of these depending members 14 is the plate 15 and which contacts with the plate 10 along its whole area. The lower ends of the depending members 14 are angularly extended as at 16 and provided with the flat lower faces 17, to which is attached the transverse plate 18 forming a piston, this plate exactly fitting the chamber 11. Preferably the angular terminations 16 of the depending members 14 are connected to the arms 13 by means of the braces 19. The plate 18 acts as a piston, located within the piston chamber 11. As the plate 18 is depressed in the chamber 11, the air between the plate 18 and the end wall 12 of the chamber 11 is compressed, thus cushioning the downward movement of the piston 18. When, however, this piston is raised, the upward movement of the piston will be retarded, thus cushioning the upward movement of the parts. The plate 15 carries upon its outer face certain indicia, as will be later described, indicating the weight of the object being weighed and the cost per pound or for transportation for various distances. The cross bar 6 also carries upon it certain indicia corresponding to different multiples of pounds or miles. The arms 13 are provided with extensions 20 which are counterweighted by any suitable counterweight 21, this counterweight being shown as being supported on a cross bar 22. Fast to the rock shaft 13 adjacent to the standard 7 is a scale beam 23 which is provided with a counterweight 24. This weight may be shifted along the beam 23 and held in any adjusted position by means of a set screw or like device. Normally, the arm 23 depends vertically from the rock shaft 8. Also mounted upon the rock shaft is a disk or wheel 25 which is grooved upon its circumference, and passing over this wheel and attached at one end thereto is a cord, chain or other flexible connection 26. The free end of this cord or flexible connection extends downward and is attached at its lower end to an lever 27, which in turn is operatively connected to the platform whereon the goods to be weighed are placed in such manner that a weight placed upon the platform will depress the extremity of the lever 27 and thus draw upon the flexible connection 26, thus rotating the rock shaft 8 and raising the arms 13 and the parts connected thereto.

Preferably, the lever 27 is connected to a frame 28 which includes a cross bar 29 having at its ends the forwardly extending arms 30. The forward ends of these arms are supported upon pivot bearings and the arms are preferably provided with rollers 31. Pivotally mounted upon the side pieces 2 is a frame 32 comprising a cross bar 33 and the arms or side bars 34 which correspond to the arms 30 and which are pivotally supported at their extremities in the side pieces 2, as will be later described. The cross bar 33 is cut away or otherwise formed so as to be depressed below the level of the lever 27 and so as to permit the lever to pass over the cross bar 33, and to permit the lever to have free vertical movement. The cross bars 33 and 29 are preferably connected by a link 35, preferably having the form of a ring so that a depression of the adjacent ends of either of the frames 28 and 32 will cause a depression of the lever 27.

Supported upon the frames 28 and 32 is a platform 36 having transversely extending cleats 37, these cleats at their ends being beveled as at 38 to rest upon the rollers 31 of the frames 28 and 32. The cleats 37 are provided with depending pins or like members 39 preventing the cleats from rolling off of the rollers. It will be seen that the rollers provide an antifriction bearing for supporting the platform upon the frames 28 and 32.

While I do not wish to limit myself to any particular manner of pivotally supporting the arms 30 and 34, I preferably support the arms as illustrated in Fig. 6. Projecting upward from the bottom 4 of the frame or casing are the standards 40, and extending between each of the standards and the adjacent side piece 2, is a knife edged bar 41, this bar being triangular in section and so disposed that its knife edge is upward. The bar is disposed above the end of the arm 30 or 34, and mounted upon the bar 41 are the oppositely disposed spaced rings 42, preferably connected by a web 43, the rings projecting below the web 43. Passing through the extremity of the arm 34 or 30 is the bar 44 which is triangular in section and which has its apex extending downward so that the knife edge of the bar rests upon the rings 42 and forms a fulcrum for the arm 30 or 34. It will be seen that with this construction, the arm 30 or 34 is pivotally supported and at the same time it can rock backward or forward, as is of course necessary to permit the platform to be depressed.

The face of the plate 15 is traversed by a series of transverse spaced lines defining spaces 45. Extending down preferably at the middle of the plate 15 is a column 46 having figures thereon denoting pounds. As illustrated, these figures proceed in an ascending series from the top of the plate 15 to the bottom thereof, the figures corresponding to the spaces 45. On each side of the column 46 and in the spaces 45 are arranged numerals denoting the total charge for any multiple of a pound. The cross bar 6 carries upon its face figures denoting charges per pound. As shown, these figures are arranged in an ascending series from left to right, as 4, 5, 6, 7, 8 and 9. Thus if the article weighs 3 lbs. and the charge per pound is 5¢, then when the article is weighed the plate 15 will be raised such a height that the numeral 3 will show just above the cross bar 6, and there will appear above the numeral 5 on the cross bar scale, the figure 15 denoting that the total charge for the article is 15¢. If the article for instance is worth 10¢ a pound, then there will appear above the character 10 on the cross bar 6 the numeral 30, indicating that the total charge is 30¢.

Preferably the operative parts of the scale will be entirely inclosed within a casing. The lower part 47 of this casing is designed to inclose the side pieces 5 and to extend down to a level with the platform 36, this casing resting upon the side pieces 2 and a cross piece 48 attached to the lower ends of the standards 5. In order to provide for the upward movement of the arms 13 and the plate 15, I provide the section 49 of the casing, one face of which is preferably arcuate and is concentric to the pivotal center of the rock shaft 8. The lower face of this casing 49 is cut away as at 50 so as to permit the figures and characters carried upon the face of the scale plate 15 to be observed. The upper edge of the plate 47 is provided with the transverse series of characters 51, previously referred to, indicating the charges per pound. Preferably, the space within which the scale beam 23 operates is also inclosed, though this is not absolutely necessary.

The operation of my scale will be evident from what has gone before. A weight placed upon the platform 36, through the lever 27 and the connection 26, will cause a rotation of the rock shaft 8, in such direction that the arms 13 will be raised, carrying with them the scale plate 15. This action is resisted by the counterweight 24, the counterweight 21 merely acting to counterbalance the arms 13, the depending members 14 and the scale plate 15. It will be obvious that the weight 24 will exert a comparatively slight counterweighting action upon the arm 23 as the arm commences to move from its normal vertical position, and that the action of this weight increases as the arm is moved to a horizontal position. It is obvious, however, that I do not need to have the scale beam or arm 23 depend vertically from the rock shaft 8 as it might be arranged at an angle or nearly horizontal, if desired.

In order to adjust the scale, I preferably provide the lever 27 with an adjustable weight 52, which is illustrated as being slidingly arranged upon a rod 53 supported from the lever 27. Preferably this weight 52 has a screw threaded engagement with the rod 52$^a$ so that it may be very delicately adjusted and will not shift. Upon an upward movement of the arms 13, the movement of the piston plate 18 will be retarded, by its tendency to cause a vacuum in the lower end of the chamber 11. When the weight is removed from the platform 32, however, the downward movement of the piston plate 18 will be checked by the air in the lower portion of the chamber 11, and as a consequence the parts will not return to their normal position with any shock or jar. Thus the delicate mechanism of the scales will not be damaged. This is particularly necessary where heavy weights are being placed upon the scales, or where the scales are being used hastily and without care, as where commodities are being weighed in shops.

While I have shown what I believe to be the most effective form of my device, I do not wish to be limited to this form as it is obvious that modifications might be made without departing from the spirit of the invention. Thus I may provide at the end of the chamber 11 an opening 12$^a$, passage through which is controlled by a trap valve 53 which closes upon a downward movement of the piston plate 18 but opens upon an upward movement of the piston, thus cushioning the downward movement of the piston and of the scale beam but only slightly cushioning the outward movement of the piston. It will be seen that when the piston is working slowly in the piston chamber there will be very little cushioning in either direction. The object of the cushioning devices is to eliminate the jolts or jars to the delicate machinery incident to the placing of heavy weights suddenly upon the scales or their sudden removal.

What I claim is:

1. A computing scale including in its organization a vertically movable platform, a piston chamber entirely open at one end, the other end of the piston chamber being formed with an opening, an inwardly movable valve normally closing said opening, a piston mounted in the chamber, a scale beam, and operative connections between the platform, scale beam and piston whereby the scale beam shall be operated and the piston moved toward the open end of the piston chamber upon a vertical movement of the platform.

2. A computing scale including in its organization a vertically movable counterweighted platform, a piston chamber open at one end and closed at the other, said closed end of the piston chamber being formed with an air inlet opening, an inwardly movable valve normally closing said air opening, a piston movable in the piston chamber, and operative connections between the platform and said piston.

3. A computing scale including in its organization a vertically movable platform, a rock shaft, operative connections between the platform and the rock shaft, a counterweighted beam extending from the rock shaft, arms extending radially from the rock shaft, a piston chamber extending concentric to the rock shaft, and a piston connected to the arms and movable in said piston chamber, said piston chamber having its upper end open and its lower end provided with an air inlet valve closing against pressure from within the piston chamber.

4. A computing scale including in its organization a casing, a rock shaft supported in one end of the casing, arms projecting from the rock shaft and carrying a piston and a scale plate, a chamber mounted in the casing in which said piston moves, said chamber being concentric to the rock shaft, a counterweighted beam on the rock shaft, a circular disk on the rock shaft, a pivoted scale platform, a lever attached to the platform, and a flexible connection passing over the disk on the rock shaft and connected to the free end of the lever.

5. A computing scale including in its organization an exterior casing, a platform formed in two sections, each section being pivoted at one edge, the adjacent edges of the sections being free to move vertically, a connection between the two sections, a lever extending from one of said sections, a rock shaft, a disk on the rock shaft, a flexible connection passing over the disk and connected to the lever, a counterweighted beam on the rock shaft, a piston chamber concentric to the rock shaft, arms projecting radially from the rock shaft and supporting a piston movable in said chamber, a scale plate carried upon the arms and movable therewith, and a fixed scale plate extending across the direction of travel of the movable scale plate.

6. A computing scale including in its organization a platform formed in two sections, each section being pivoted at one edge, the adjacent edges of the sections being free to move vertically and being connected to each other, vertically disposed rotatable supporting disks mounted on each section, a plate having triangular members on its under side resting upon said disks, a scale beam, and operative connections between the platform and said scale beam.

In testimony whereof, I affix my signature in presence of two witnesses.

RALPH B. LARRABEE.

Witnesses:
 EBEN W. SWEATT,
 JOHN C. WILLIAMS.

Copies of this patent may be obtained for five cents each, by addressing the "Commissioner of Patents, Washington, D. C."